United States Patent [19]

Chinnaswamy et al.

[11] Patent Number: 5,496,895
[45] Date of Patent: Mar. 5, 1996

[54] BIODEGRADABLE POLYMERS

[75] Inventors: Rangaswamy Chinnaswamy; Milford A. Hanna, both of Lincoln, Nebr.

[73] Assignee: The Board of Regents of the University of Nebraska, Lincoln, Nebr.

[21] Appl. No.: 942,132

[22] Filed: Sep. 8, 1992

Related U.S. Application Data

[63] Continuation of Ser. No. 393,373, Aug. 14, 1989, abandoned.

[51] Int. Cl.$^6$ .......................... C08G 63/48; C08G 63/91; C08F 8/00; C08F 32/00
[52] U.S. Cl. .................. 525/54.2; 525/54.3; 525/326.1; 525/374; 525/379; 525/380; 525/382; 527/300
[58] Field of Search .................................. 525/54.2, 54.3, 525/326.1, 374, 379, 380, 382; 527/300

[56] References Cited

U.S. PATENT DOCUMENTS 4,451,629 5/1984 Tanaka et al. ...................... 526/238.23
4,891,404 1/1990 Narayan et al. ........................ 525/54.2

*Primary Examiner*—Nathan M. Nutter
*Attorney, Agent, or Firm*—Vincent L. Carney

[57] ABSTRACT

To prepare a biodegradable plastic, biodegradable materials such as starches and a non-biodegradable polymer such as a polystyrene, polyurethane, polyethylene, polypropylene, or polycarbonate are treated: (1) under heat, pressure and reagents to break the polymers; and (2) by adding to them an oxidizing agent. This treatment forms and/or makes available reactive groups for bonding: (1) on the biodegradable material groups such as aldehyde or hydroxyl groups in the case of the carbohydrates and amine groups in the case of proteins and certain other compounds such as urea; and (2) on the non-biodegradable plastic groups such as aldehydes, methyl, propyl, ethyl, benzyl or hyroxyl groups. In one embodiment, plastic and starch are processed in an extruder by: (1) mixing a starch in a range of between 15 percent and 80 percent, an oxidizing agent and an agent to break up the starch and the plastics; and (2) subjecting the combination to sufficient heat and/or pressure to break the plastic into shorter chains and bond monosaccharides to monomers from the non-biodegradable polymer.

4 Claims, No Drawings

5,496,895

BIODEGRADABLE POLYMERS

This application is a continuation of application Ser. No. 07/393,373, filed Aug. 14, 1989, now abandoned.

BACKGROUND OF THE INVENTION

This invention relates to biodegradable polymers and to methods of making them from non-biodegradable polymers such as petroleum -based plastics combined with other biodegradable polymers, such as for example, carbohydrates, proteins, lipids or the like.

It is known to alter polymers such as petroleum-based plastics by the incorporation of some carbohydrates to increase their biodegradability. One prior art biodegradable polymer and method of making it is disclosed in U.S. Pat. No. 4,016,117 to Griffin, issued Apr. 5, 1977. In this product, a synthetic resin incorporates particles of biodegradable substances and an auto-oxidizable substance. The processing preserves the starch granules in the final product. This polymer, when it contacts a transition metallic salt, auto-oxidizes to generate a peroxide or a hydroperoxide.

Other biodegradable products are disclosed in U.S. Pat. Nos. 4,405,731 to Carter issued Sep. 20, 1983; 3,778,392 to Hughes issued Dec. 11, 1973; 3,949,145 to Otey et al. issued Apr. 6, 1979; and 4,280,920 to Kesting.

The biodegradable plastics disclosed in these United States patents have the disadvantages of only containing from approximately 5 percent to 15 percent carbohydrate while retaining its characteristics as a plastic although they may have up to 50 percent starch but become paperlike at such high levels and lose the typical characteristics of thermoplastic or thermosetting plastics. The altered structure reduces the elasticity and shear strength.

SUMMARY OF THE INVENTION

Accordingly, it is an object of the invention to provide a novel biodegradable polymer.

It is a further object of the invention to provide a novel process for making biodegradable polymers.

It is a still further object of the invention to provide a novel biodegradable polymer in which a carbohydrate or protein or possibly lipids may be substituted in percentages between 15 percent and 80 percent while preserving a substantial number of the desirable properties of the polymer.

It is a still further object of the invention to make a novel biodegradable polymer using a process which causes chemical modification of a carbohydrate or protein or possibly lipids or urea and a non-biodegradable polymer to make a biodegradable polymer.

It is a still further object of the invention to provide a novel biodegradable plastic and process for incorporating carbohydrates or proteins or possibly lipids into polystyrene, polyurethane, polyethylene, polypropylene, or polycarbonate plastics in quantities greater than 15 percent while preserving many of the functional characteristics of the plastic.

It is a still further object of the invention to provide a novel foam plastic product and method of making it.

It is a still further object of the invention to provide a novel film plastic product and method of making it.

In accordance with the above and further objects of the invention, a biodegradable polymer is provided having polymeric chains that include both hydrocarbon monomers from a non-biodegradable polymer and other biodegradable groups such as monosaccharides or amino acids or the like that render the polymer biodegradable. In these polymers, the biodegradable groups and hydrocarbon monomers are bonded or interconnected by single and/or double bond covalent linkages, hydrocarbon or bridge bonds, Van der Waals' forces or the like to each other. The biodegradable groups may be obtained from carbohydrates, proteins, lipids, urea or other materials that can result in groups that combine with the hydrocarbon monomers from the plastic while retaining biodegradability.

In preparing the biodegradable plastic, the biodegradable group and a non-biodegradable polymer such as a polystyrene, polyurethane, polyethylene, polypropylene, or polycarbonate are treated: (1) under heat, pressure and reagents to break the polymers; and (2) by adding to them an oxidizing agent. This treatment forms and/or makes available reactive groups for bonding: (1) on the biodegradable material such as aldehyde or hydroxyl groups in the case of the carbohydrates and amine groups in the case of proteins and certain other compounds such as urea; and (2) on the non-biodegradable polymers such as aldehydes, methyl, propyl, ethyl, benzyl or hyroxyl groups.

In one embodiment, the non-biodegradable polymer is treated by: (1) adding to it a carbohydrate in a range of between 15 percent and 80 percent, an oxidizing agent and an agent to break up the starch or similar carbohydrates; and (2) subjecting the combination to sufficient heat and/or pressure to break the polymer into shorter chains and bond monosaccharides to monomers from the non-biodegradable polymer.

In one example of this embodiment, the non-biodegradable polymer is polystyrene, the oxidizing agent is citric acid and the substance for degrading the starch is sodium bicarbonate. The heat and pressure is provided by extruding the combination at high temperatures to form a biodegradable foam plastic in which the sodium bicarbonate and citric acid: (1) release carbon dioxide as a foaming agent; (2) oxidize the methyl groups of the styrene to form groups such as aldehyde groups which react with groups on the starch; and (3) form sodium hydroxide to degrade the starch and thus to form aldehydes such as formaldehyde or hydroxyl groups to react with the styrene. Similarly, proteins can be degraded to amino acids or aldehyde compounds having reactive amine or carboxyl groups to react with the hydroxyl or aldehyde groups of the oxidized carbohydrate.

As can be understood from the above description, the biodegradable polymer of this invention and the method of making it have several advantages, such as for example: (1) the biodegradable polymer retains its physical characteristics with a large percentage of carbohydrate added or protein or other biodegradable material; (2) the biodegradable polymer effectively degrades when discarded; (3) the process permits the inclusion of a large amount of carbohydrate; and (4) the biodegradable polymer is less expensive than other biodegradable polymers.

DETAILED DESCRIPTION

A carbohydrate, protein or lipid substituted biodegradable polymer or other substituted biodegradable polymer such as a urea substituted biodegradable polymer includes a polymeric chain including both hydrocarbon monomers such as alkyne and alkene polymers derived from petroleum and biodegradable monomers, such as amino acids or monosaccharides or lipids, preferably obtained from agricultural products, such as wheat or corn, in a molecule. The hydrocarbon monomers and monosaccharides or amino acids or other such groups are covalently bound to each other.

More specifically, the monosaccharides or amino groups or carboxyl groups of lipids are bound in groups or chains of units or as a single monomer side-chains or branches of the feedstock to hydrocarbon polymers and/or within the hydrocarbon chain to pairs of monomers such as glucose, styrene, ethylene, benzyl, acetyl (for lipids) and amino acids. The monosaccharide, amino or carboxyl groups or group are bonded to hydrocarbon monomers from the feedstock non-biodegradable polymer and similarly the hydrocarbon monomers from the feedstock non-biodegradable polymer may be connected as single monomers to monosaccharides or amino acids or the like or be bonded as chains of hydrocarbon monomers. The different types of monomers are distributed throughout the polymer molecules of the biodegradable polymer. The monomers originating from the petroleum based polymer and from the biodegradable carbohydrate, protein, lipid or urea may be interconnected by single and/or double bond covalent linkages, hydrocarbon or bridge bonds, Van der Waals' forces or the like but most commonly by covalent bonds.

The biodegradable polymers are prepared by a high-temperature short-time, high-shear extrusion process in which one or more biodegradable material such as carbohydrate or protein or lipid or urea or the like and one or more non-biodegradable polymer such as petroleum based plastics are mixed with an oxidizing agent and a mild acid or alkali that breaks the biodegradable polymer into chains of between 1,000 to 100,000 daltons or approximately 500 to 50,000 monosaccharide groups in the case of starch or other carbohydrates or the equivalent length in proteins or lipids.

The non-biodegradable polymer may be any alkyne or alkene chain with a substituted methyl and/or other functional groups such as ethene, ethyne, propylene, propyne, butadiene and the like groups on plastics such as polystyrene, polyurethane, polyethylene, polypropylene, and polycarbonate among others. The proportion of amino acid or carbohydrate to non-degradable polymer w/w (weight to weight) is between 15 and 80 percent carbohydrate or amino acid and the carbohydrate, protein or starch should have a chain length greater than 1,000 daltons.

Suitable compounds that degrade the carbohydrates include sodium hydroxide, citric acid, sodium chloride, sodium bisulfite, urea, acrylic acid, acrylonitrile, adipic acid, aluminum trichloride, amino resins, analeic acid, phthalic acid, azo-bis-isobutyronitrile, berleculite, benzoyl peroxide, bisphenol A, boron triflouride, butadiene, casein, cellophate, acetate, butyrate, triacetate, tanthate, chloroprenyl, decamelhylene glycol, diethyl maleate, diethyl phthalate, ethylene glycol, propylene glycol, epichlorohydrin, epoxy resins, ethane, ethylene, ethylene oxide, formaldehyde, fumaric acid, glycerol, hemomethylene diamine, hexamine, isobutene, isobutylene, melamine, methacrylic acid, methyl vinyl acetone, polyehylene terephthalate, phenol, polyamides, potassium amide, sebacoyl chloride, sodium napthalide, styrene, titanium tetrachloride, vinyl chloride, vinyl sulphonic acid, zieglar catalyst.

Compounds for degrading carbohydrates are known in the art and differ from each other in their reactions with starch in known ways. Instead of a compound that degrades carbohydrates, compounds that form such carbohydrate-degrading compounds, such as sodium bicarbonate and citric acid, may also be used.

In manufacturing one suitable biodegradable polymer, a carbohydrate such as starch and non-biodegradable polymer are combined in a range of weight-to-weight ratios from approximately 4 parts non-biodegradable polymer to one part carbohydrates at one end to one part non-biodegradable polymer to two parts carbohydrate at the other end of the range and with 1 to 10 percent each of an oxidizing agent and carbohydrate degrader, and in some embodiments, a foaming agent, The combination is subjected to heat at a selected temperature falling within the range of 110 to 180 degrees Centigrade and a selected pressure falling within the range of 3 to 55 mega-Pascals.

As a result of this process, the carbohydrate molecules degrade and then react with the non-biodegradable polymer molecules to form a new polymer having interconnected chemical groups from the carbohyrate and from the original non-biodegradable polymer. The reaction under these conditions is believed to be as shown in equation 1.

In the reaction of equation 1: MS indicates any monosaccharide or amino or lipid group; R1 is any group attached to the alkyl group of a monomer of the non-biodegradable polymer; and M is any unit or monomer of the basic feedstock non-biodegradable polymer.

In equation 2, there is shown a general reaction between a carbohydrate and a non-biodegradable petroleum-based polymer. In this equation, L represents any carbohydrate monomer, M is a monomer of the non-biodegradable polymer such as polystyrene, polyethylene or the like and R1, R2, R3 are any other hydrocarbon group such as for example any acetyl, methyl, propyl, butyl or the like. Proteins or amino acids and probably lipids may be substituted into non-biodegradable polymers to further increase the degradability.

For example, as shown in equation 4 a protein or amino acid, shown as P with connected reactive groups, can react with polystyrene or other non-biodegradable polymer have n monomers to obtain the biodegradable polymer and as shown in equation 5, a lipid, shown as F with a reactant group is combined with a non-biodegradable polymer having n monomers M

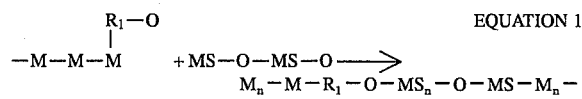

EQUATION 1

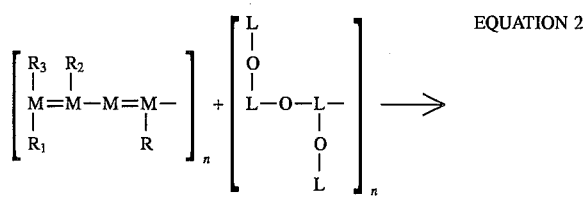

EQUATION 2

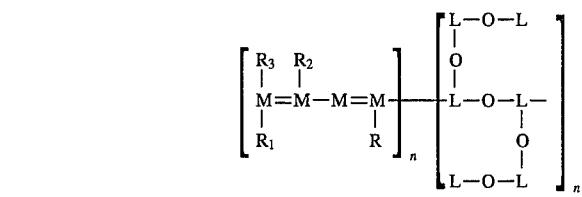

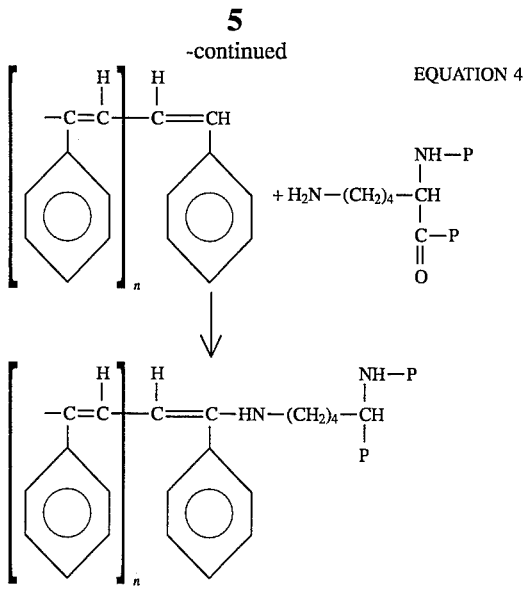

EQUATION 4

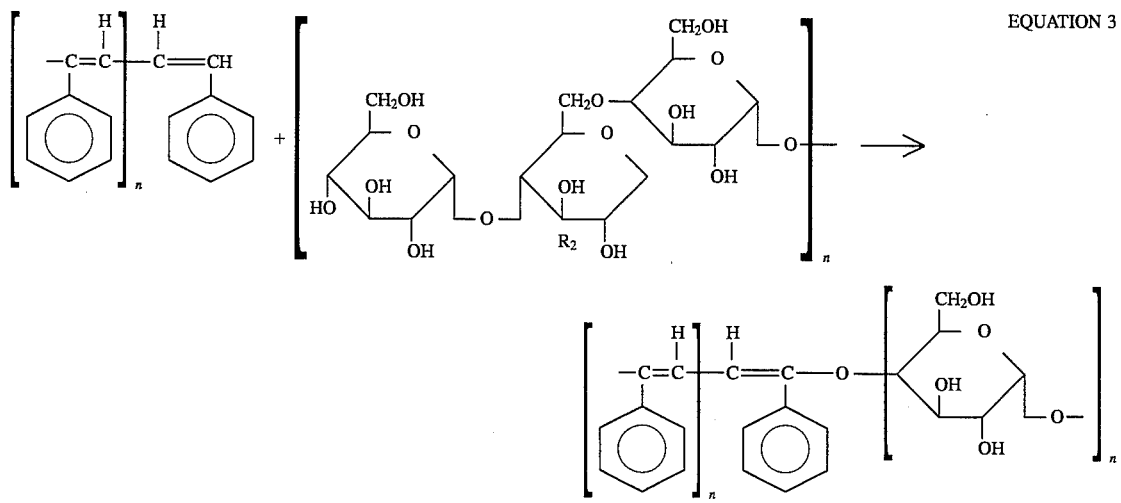

EQUATION 3

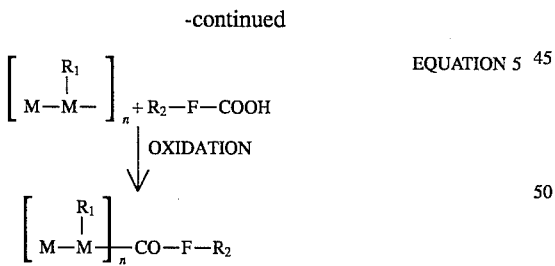

EQUATION 5 and a reactive group R1 or R2 either of which may be a carboxyl group to obtain a biodegradable polymer.

In this specification, the term "non-biodegradable" means a material, which when incubated at room temperature and 50 percent humidity for a time period of two months, shows no substantial growth of bacteria or fungi nor an increase of less than a multiple of 4 in bacteria or fungi if the initial product already contained some growth. It should suffer less than 50 percent loss of its integrity and physical strength by conversion of the polymer to carbon dioxide and lower molecular weight hydrcarbons within six months in a landfill. In this specification, the term "biodegradable material" means that after incubation at a moisture of 50 percent at room temperature for two months, the material is substan-tially degraded and has lost its mechanical strength or, if it has not reached that stage, that there has been an increase in microbial growth on the material of at least four times the starting growth. It should loose at least 50 percent of its physical integrity and strength within six months in a landfill.

Also biodegradable polymer in this specification includes those polymers that are degradable through a process by which fungi or bacteria secretes enzymes to convert a complex molecular structure of the compound to simple gasses and organic compounds and compounds capable of decomposing or deteriorating through a natural chemical process into harmless components after exposure to natural elements for not more than one year.

In the preferred embodiment, a starch based biodegradable polymer is prepared by a high-temperature short-time, high shear extrusion processes. Starch and polystyrene are combined in a ratio of 60 percent to 40 percent and with 1 to 10 percent each of citric acid and sodium bicarbonate when extrusion-cooked at a temperature of 140 decrees Centigrade and a pressure of approximately 20 mega-Pascals.

The starch molecules degrade and then react with polystyrene molecules to form a network. The citric acid controls the molecular degradation and interactions. The sodium bicarbonate decomposes to NaOH and $CO_2$. The NaOH degrades the starch molecules and the $CO_2$ contributes to the uniform foam structure of the product. A reaction under these conditions is believed to be illustrated as shown in equation 3 in which the left-hand top formula is that of a polystyrene, the top right formula is that of a starch and the bottom formula is the formula of the new biodegradable polystyrene.

The process of choice appears to be high-temperature short-time extrusion. This process, including the steps for forming containers is described in "Foam, Extruded Polystyrene", *Encyclopedia of Packaging Technology* by Bakker, copyright 1986, published by John Wiley & Sons, Inc, N.Y. N.Y., USA, page 345, the disclosure of which is incorporated herein by reference. However, techniques such as thermosetting, injection molding and dispersion pressurized reactors may also provide satisfactory reaction conditions to form a similar starch-polystyrene network.

The resultant product may find use as meat trays, cups, egg cartons, plates, bowls, loose-fill packaging materials, insulation and sound proofing materials. In other words, it can be used in areas where expanded plastics are currently being used. Moreover, other plastic products such as bottles and wrapping materials, may be made using corresponding non-biodegradable plastics as a feedstock. For some uses a rodenticide or repellant and an insecticide or repellant or antimicrobial agents may be included.

The invention is illustrated by the following examples:

EXAMPLES

GENERAL

The temperatures and pressures in the examples are applied during extrusion of the combination of ingredients. The starch in the actual examples was obtained from corn and wheat but can also be obtained from sorghum, potato, rice and tapioca.

EXAMPLE 1

Wheat starch and polystyrene are mixed in a ratio of 66 percent wheat starch by weight to 27 percent polystyrene and combined with 3 percent c acid and 6 percent sodium bicarbonate. They are extrusion-cooked at a temperature of 140 degrees Centigrade and a pressure of approximately 20 mega-Pascals.

The resulting product has the appearance of the original expanded polystyrene.

EXAMPLE 2

Wheat starch and polystyrene are mixed in a ratio of 38.1 percent wheat starch by weight to 57.1 percent polystyrene and combined with 1.6 percent citric acid and 3.2 percent sodium bicarbonate. They are extrusion-cooked at a temperature of 140 degrees Centigrade and a pressure of approximately 20 mega-Pascals.

The resulting product has the appearance of the original expanded polystyrene.

EXAMPLE 3

Wheat starch and polystyrene are mixed in a ratio of 52.9 percent wheat starch by weight to 35.3 percent polystyrene and combined with 4.4 percent citric acid and 7.4 percent sodium bicarbonate. They are extrusion-cooked at a temperature of 140 degrees Centigrade and a pressure of approximately 20 mega-Pascals.

The resulting product has the appearance of the original expanded polystyrene.

EXAMPLE 4

Wheat starch and polystyrene are mixed in a ratio of 23.4 percent wheat starch by weight to 70.3 percent polystyrene and combined with 1.6 percent citric acid and 4.7 percent sodium bicarbonate. They are extrusion-cooked at a temperature of 140 degrees Centigrade and a pressure of approximately 20 mega-Pascals.

The resulting product has the appearance of the original expanded polystyrene.

EXAMPLE 5

One percent milk protein and 20 percent corn starch and/or wheat starch are combined with 79 percent polystryene, 1.6 percent citric acid and 4.7 percent sodium bicarbonate. They are extrusion-cooked at a temperature of 140 degrees Centigrade and a pressure of approximately 20 mega-Pascals.

The resulting product has the appearance of the original expanded polystyrene.

EXAMPLE 6

One percent wheat protein (isolated) and 20 percent corn starch and/or wheat starch are combined with 79 percent polystryene combined with 1.6 percent citric acid and 4.7 percent sodium bicarbonate. They are extrusion-cooked at a temperature of 140 degrees Centigrade and a pressure of approximately 20 mega-Pascals.

The resulting product has the appearance of the original expanded polystyrene.

As can be understood from the above description, the biodegradable polymer of this invention and the method of making it have several advantages, such as for example: (1) the biodegradable polymer is less expensive. than other biodegradable polymers; (2) the biodegradable polymer retains its physical characteristics with a large percentage of carbohydrate added; (3) the biodegradable polymer effectively degrades when discarded; and (4) the process permits the inclusion of a larger amount of carbohydrate.

Although a preferred embodiment of the invention has been described with some particularity, many modification and variations in the preferred embodiment may be made without deviating from the invention. Accordingly, it is to understood that, within the scope of the appended claims, the invention may be practiced other than as specifically described.

What is claimed is:

1. A biodegradable polymer comprising polymeric chains that include both monosaccharides from a starch feedstock and hydrocarbon monomers from a feedstock non-biodegradable plastic covalently bound to each other in ratios by weight of between 15 and 80 percent monosaccharide from starch feedstock to hydrocarbon from the feedstock non-biodegradable plastic, wherein at least some of the monosaccharides are bound by covalent bonds within the hydrocarbon chain of the biodegradable polymer.

2. A method of making a biodegradable polymer comprising the steps of: combining a carbohydrate and a non-biodegradable polymer with material that breaks up the carbohydrate and causing a reaction under heat and pressure which substitutes at least some monosaccharide groups from the carbohydrate into the non-biodegradable polymer chain wherein the percentage by weight of substituted carbohydrate to non-biodegradable polymer is between 15 to 80 percent.

3. A process according to claim 2 wherein the non-biodegradable polymer is a polystyrene and the carbohydrate is a starch.

4. A method of making a biodegradable polymer comprising the steps of: combining a carbohydrate and non-biodegradable polymer with material that breaks up he carbohydrate and causing a reaction under heat and pressure which substitutes at least some monosaccharide groups from the carbohydrate into the non-biodegradable polymer chain wherein the percentage by weight of substituted carbohydrate to non-biodegradable polymer is between 15 to 80 percent;

the non-biodegradable polymer is a polystyrene and the carbohydrate is a starch;

the combination is injection molded in a dispersion pressurized reactor; the carbohydrate to polystyrene ratio is 60 percent to 40 percent and includes 10 to 20 grams of citric acid and sodium bicarbonate and is extrusion processed at a temperature of substantially 140 degrees Centigrade and a pressure of approximately 20 megaPascals.

* * * * *